United States Patent [19]
Prabhu et al.

[11] Patent Number: 5,870,323
[45] Date of Patent: Feb. 9, 1999

[54] THREE OVERLAPPED STAGES OF RADIX-2 SQUARE ROOT/DIVISION WITH SPECULATIVE EXECUTION

[75] Inventors: J. Arjun Prabhu, Palo Alto; Grzegorz B. Zyner, San Jose, both of Calif.

[73] Assignee: Sun Microsystems, Inc., Palo Alto, Calif.

[21] Appl. No.: 928,073

[22] Filed: Sep. 11, 1997

Related U.S. Application Data

[63] Continuation of Ser. No. 498,424, Jul. 5, 1995, Pat. No. 5,696,712.

[51] Int. Cl.$^6$ .................................. G06F 7/52
[52] U.S. Cl. .................... 364/761; 364/767; 364/766; 364/744
[58] Field of Search ............... 364/767, 761, 364/766, 744

[56] References Cited

U.S. PATENT DOCUMENTS

| | | | |
|---|---|---|---|
| 3,591,787 | 7/1971 | Freiman et al. | 364/767 |
| 4,724,529 | 2/1988 | Irukulla et al. | 364/761 |
| 4,992,969 | 2/1991 | Yamahata | 364/761 |
| 5,023,827 | 6/1991 | Kehl et al. | 364/744 |
| 5,105,378 | 4/1992 | Mori | 364/761 |
| 5,128,891 | 7/1992 | Lynch et al. | 364/767 |
| 5,206,828 | 4/1993 | Shah et al. | 364/761 X |
| 5,239,498 | 8/1993 | Girard | 364/761 X |
| 5,404,324 | 4/1995 | Colon-Bonet | 364/761 |
| 5,696,712 | 12/1997 | Prabhu et al. | 364/761 |

OTHER PUBLICATIONS

G.S. Taylor, "Radix 16 SRT Dividers with Overlapped Quotient Selection Stages", Proc. Seventh IEEE Symp. Compt. Arithmetic, pp. 64–71, 1985.

M.D. Ercegovac and T. Lang, "Division and Square Root: Digital–recurrence Algoithms and Implemenations", Kluwer Academic Publishers, 1994, Ch. 3.

M.D. Ercegovac, T. Lang, J.G. Nash, L.P. Chow, "An Area–Time Efficient Binary Divider", Proc. IEEE International Conference on Computer Design, pp. 645–648, 1987.

*Primary Examiner*—Ayaz R. Sheikh
*Assistant Examiner*—Douglas S. Lee
*Attorney, Agent, or Firm*—Limbach & Limbach L.L.P.

[57] ABSTRACT

In hardware SRT division and square root mantissa units maximal quotient selection overlapping for three quotient digits per cycle are used. An effective radix-8 implementation cascades three partial remainder computation circuits and overlaps three quotient selection circuits. Two carry save adders speculatively compute the possible resulting partial remainders corresponding to each possible value, −1, 0, and +1, of the quotient digit by adding the divisor, not adding anything, and adding the two's complement of the divisor, respectively, thus shortening the critical path of a single SRT iteration producing a single quotient digit. The propagation delays of two carry save adders which speculatively compute the possible resulting partial remainders are masked by a longer delay through quotient selection logic.

15 Claims, 10 Drawing Sheets

5,870,323

THREE OVERLAPPED STAGES OF RADIX-2 SQUARE ROOT/DIVISION WITH SPECULATIVE EXECUTION

This is a continuation of application Ser. No. 08/498,424, filed Jul. 5, 1995 now U.S. Pat. No. 5,696,712.

BACKGROUND OF THE INVENTION

1. Field of the Invention

The present invention relates to the field of SRT division and square root mantissa units suitable for use in floating point units of microprocessors. Specifically, the present invention relates to SRT hardware dividers and square root units that produce multiple quotient digits per clock cycle.

2. Discussion of the Related Art

The SRT algorithm provides one way of performing non-restoring division. See, J. E. Robertson, "A new class of digital division methods," *IEEE Trans. Comput.*, vol. C-7, pp. 218–222, September 1958, and K. D. Tocher, "Techniques of multiplication and division for automatic binary computers," *Quart. J. Mech. Appl. Math.*, vol. 11, pt. 3, pp. 364–384, 1958. Digital division takes a divisor and a dividend as operands and generates a quotient as output. The quotient digits are calculated iteratively, producing the most significant quotient digits first. In SRT division, unlike other division algorithms, each successive quotient digit is formulated based only on a few of the most significant partial remainder digits, rather than by looking at the entire partial remainder, which may have a very large number of digits. Since it is not possible to insure correct quotient digit selection without considering the entire partial remainder in any given iteration, the SRT algorithm occasionally produces incorrect quotient digit results. However, the SRT algorithm provides positive, zero, and negative quotient digit possibilities. If the quotient digit in one iteration is overestimated, then that error is corrected the next iteration by selecting a negative quotient digit. In SRT division, quotient digits must never be underestimated; quotient digits must always be overestimated or correctly estimated. By never underestimating any quotient digits, the partial remainder is kept within prescribed bounds so as to allow the correct final quotient to be computed. Because the SRT algorithm allows negative quotient digits, the computation of the final quotient output usually involves weighted adding and subtracting of the quotient digits, rather than merely concatenating all the quotient digits as in normal division.

The higher the radix the more digits of quotient developed per iteration but at a cost of greater complexity. A radix-2 implementation produces one digit per iteration; whereas a radix-4 implementation produces two digits per iteration. FIG. 1 illustrates a simple SRT radix-2 floating point implementation. The simple SRT radix-2 floating point implementation shown in FIG. 1 requires that the divisor and dividend both be positive and normalized; therefore, $1/2 \leq D$, Dividend<1. The initial shifted partial remainder, 2PR|0], is the dividend. Before beginning the first quotient digit calculation iteration, the dividend is loaded into the partial remainder register 100; thus, the initial partial remainder is the dividend. Subsequently, the partial remainders produced by iteration are developed according to the following equation.

$$PR_{i+1} = 2PR_i - q_{i+1}D \qquad (1)$$

In Equation 1, $q_{i+1}$ is the quotient digit, and has possible values of −1, 0, or +1. This quotient digit $q_{i+1}$ is solely determined by the value of the previous partial remainder and is independent of the divisor. The quotient selection logic 102 takes only the most significant four bits of the partial remainder as input, and produces the quotient digit. In division calculations, the divisor remains constant throughout all iterations. However, square root calculations typically involve adjustments to the divisor stored in the divisor register 101 after each iteration. Therefore, the independence of the quotient digit selection on the divisor is an attractive feature for square root calculations.

The partial remainder is typically kept in redundant carry save form so that calculations of the next partial remainder can be performed by carry-save adders instead of slower and larger carry-propagate adders. The partial remainder is converted into non-redundant form after all iterations have been performed and the desired precision has been reached. Because the SRT algorithm allows overestimation of quotient digits resulting in a negative subsequent partial remainder, it is possible that the last quotient digit is overestimated, so that the final partial remainder is negative. In that case, since it is impossible to correct for the overestimation, it is necessary to maintain Q and Q−1, so that if the final partial remainder is negative, Q−1 is selected instead of Q. The quotient digits are normally also kept in redundant form and converted to non-redundant form at the end of all iterations. Alternatively, the quotient and quotient minus one (Q and Q−1) can be generated on the fly according to rules developed in M. D. Ercegovac and T. Lang, "On-the-fly rounding," *IEEE Trans. Comput.*, vol. 41, no. 12, pp. 1497–1503, December 1992.

The SRT algorithm has been extended to square root calculations allowing the utilization of existing division hardware. The simplified square root equation looks surprisingly similar to that of division. See, M. D. Ercegovac and T. Lang, "Radix-4 square root without initial PLA," *IEEE Trans. Comput.*, vol. 39, no. 8, pp. 1016–1024, August 1990. The iteration equation for square root calculations is as follows.

$$PR_{i+1} = 2PR_i - q_{i+1}(2Q_i + q_{i+1}2^{-(i+1)}) \qquad (2)$$

In Equation 2, the terms in parentheses are the effective divisor. For square root calculations, the so-called divisor is a function of $Q_i$, which is a function of all the previous root digits $q_1$ through $q_i$. The root digits will be referred to as "quotient digits" to maintain consistency in terminology. Therefore, in order to support square root calculation using the same hardware as used for division, on-the-fly quotient generation is required in order to update the divisor after each iteration.

Binary division algorithms are analogous to standard base 10 long division which is taught in grammar school. In R+D=Q, each quotient digit for Q is guessed. In order to determine the first quotient digit, a guess for the proper quotient digit is multiplied by the divisor, and that product is subtracted from the dividend to produce a remainder. If the remainder is greater than the divisor, the guess for the quotient digit was too small; if the remainder is negative, the guess for the quotient digit was too large. In either case, when the guess for the quotient digit is incorrect, the guess must be changed so that the correct quotient digit is derived before proceeding to the next digit. The quotient digit is correct when the following relation is true: $0 \leq PR < D$, in which PR stands for the partial remainder after subtraction of the quotient digit multiplied by the divisor.

The key to the SRT division algorithm is that negative quotient digits are permitted. For example, in base 10, in addition to the standard digits 0 through 9, quotient digits may take on values of −1 through −9. Consider the division operation 600÷40. If the correct quotient digits are selected for each iteration, the correct result is 15. However, assume for the moment that during the first iteration, a quotient digit of 2 was incorrectly guessed instead of the correct digit of 1. The partial remainder after 2 has been selected as the first quotient digit is 600−(2*40*10$^1$)=−200. According to SRT division, this error can be corrected in subsequent iterations, rather than having to back up and perform the first iteration again. According to SRT division, assume that the second quotient digit is correctly guessed to be −5. The partial remainder after that iteration will be −200−(−5*40*10$^0$)=0. When the partial remainder after an iteration is zero, the correct values for all the remaining digits are zeros. Thus, the computed result is 2*10$^1$+−5*10$^0$=15, which is the correct result. The SRT algorithm thus allows an overestimation of any given quotient digit to be corrected by the subsequent selection of one or more negative quotient digits. It is worth noting that the estimated quotient digit must not be more than one greater than the correct quotient digit in order to subsequently reduce the partial remainder to zero, thus computing the correct result. If errors greater than positive one were allowed in estimating quotient digits, then quotient digits less than −9 (for example −10, −11, etc.) would be required in base 10. Similarly, since the range of quotient digits is not expanded in the positive direction at all according to the SRT algorithm, underestimation of the correct quotient digit is fatal, because the resulting partial remainder will be greater than the divisor multiplied by the base, and a subsequent quotient digit higher than 9 (for example 10, 11, etc.) in base 10 would be required. Therefore, in order to keep the partial remainder within prescribed bounds, the quotient digit selection must never underestimate the correct quotient digit, and if it overestimates the quotient digit, it must do so by no more than one.

It is possible to guarantee that the above criteria for keeping the partial remainder within prescribed bounds will be satisfied without considering all the partial remainder digits, only a few of the most significant digits of the partial remainder must be considered in order to choose a quotient digit which will allow the correct result to be computed. SRT division requires a final addition after all quotient digits have been selected to reduce the redundant quotient representation into standard non-redundant form having only non-negative digits. In binary (base 2) which is utilized in modern electrical computation circuits, SRT division provides quotient digits of +1, 0, or −1. The logic 102 which generates quotient selection digits is the central element of an SRT division implementation.

Early research indicated that only the most significant three bits of redundant partial remainder are necessary inputs for a radix-2 quotient digit selection function. (See, S. Majerski, "Square root algorithms for high-speed digital circuits," *Proc. Sixth IEEE Symp. Comput. Arithmetic.*, pp. 99–102, 1983; and D. Zuras and W. McAllister, "Balanced delay trees and combinatorial division in VLSI," *IEEE J. Solid-State Circuits.*, vol. SC-21, no. 5, pp. 814–819, October 1986.) However more recent studies have shown that four bits are required to correctly generate quotient digit selection digits and keep the partial remainder within prescribed bounds. (See M. D. Ercegovac and T. Lang, *Division and Square Root: Digit-recurrence Algorithms and Implementations*, Kluwer Academic Publishers, 1994, ch. 3; S. Majerski, "Square-rooting algorithms for high-speed digital circuits," *IEEE Trans. Comput.*, vol. C-34, no. 8, pp. 724–733, August 1985; P. Montuschi and L. Ciminiera, "Simple radix 2 division and square root with skipping of some addition Steps," *Proc. Tenth IEEE Symp Comput. Arithmetic.* pp. 202–209, 1991; and V. Peng, S. Samudrala, and M. Gavrielov, "On the implementation of shifters, multipliers, and dividers in floating point units," *Proc. Eighth IEEE Symp. Comput. Arithmetic*, pp. 95–101, 1987. The selection rules according to the prior art can be expressed as in the following equations in which PR represents the most significant four bits of the actual partial remainder, and in which the decimal point appears between the third and fourth most significant digits. The partial remainder is in two's complement form, so that the first bit is the sign bit.

$q_{i+1}=1$, if $0 \leq 2PR \leq 3/2$, (3A)

$q_{i+1}=0$, if $2PR=-1/2$, (3B)

$q_{i+1}=-1$, if $-5/2 \leq 2PR \leq -1$. (3C)

Because the partial remainder is stored in register 100 in carry-save form, the actual most significant four bits are not available without performing a full carry propagate addition of the carry and sum portions of the partial remainder. Because it is desirable to avoid having to perform a full carry propagate addition during each iteration in order to compute the most significant four bits of the partial remainder, quotient digit selection rules can be developed using an estimated partial remainder.

Typically, the most significant four partial remainder bits are used as to select the quotient digit, as shown in FIG. 1, where the quotient selection logic 102 takes carry and sum portions of the partial remainder to select the quotient digit. For square root calculations the divisor logic 103 substitutes $2Q_i+q_{i+1}2^{-(i+1)}$ for D. The divisor logic simultaneously produces a divisor D which is used if qi+1=−1 and /D which is used if qi+1=1. D is a function of the previous quotient Q−1[i] while /D is a function of the inverted previous quotient Q[i]. The three-to-one multiplexor 104 supplies the three-to-two carry save adder 105 with either /D when $q_{i+1}=+1$, 0 when $q_{i+1}=0$, or D when $q_{i+1}=-1$. Negative D is the two's complement of D, which is /D+1; therefore, when $q_{i+1}=+1$, negative D is added to the shifted partial remainder by asserting the carry input 106 of the carry save adder 105. The iterative division and square root hardware shown in FIG. 1 accumulates the quotient Q and the quotient minus one Q−1 an accumulator 107. When the final partial remainder is negative, Q−1 is the proper quotient; when the final partial remainder is zero or positive, Q is the correct quotient. Because the iterative division and square root algorithms generate outputs bits beginning with the most significant bits and continuing to produce output bits with decreasing significance each iteration, the absolute value of partial remainder output by each iteration is either equal to or smaller than the partial remainder stored in register 100, and in either case, the most significant two bits of the resulting partial remainder are equal. The multiplication by two required for the subsequent iteration required by Equations 1 and 2 is accomplished by left shifting the redundant carry save partial remainder by one bit position before clocking into register 100. The most significant carry and sum bits of the output partial remainder are discarded, but because the most significant two bits of partial remainder were equal, the sign of the shifted partial remainder is the same as the output partial remainder. This left shifting is performed by merely wiring the output 106 of the carry save adder 105 to the input of the partial remainder register 100 in a shifted manner.

If the iterative division and square root hardware is implemented in a processor having other functional units, the cycle time is predetermined and is a function of the slowest functional unit on the processor. The critical path that limits the cycle time of the iterative division and square root hardware shown in FIG. 1 is likely to be through the quotient selection logic 102, the multiplexor 104, and the carry save adder 105. If the propagation delay through a quotient selection logic circuit 102 (QSLC) is $t_{QSLC}$, the propagation delay through the multiplexor 104 is $t_{mux}$, and the propagation delay through the carry save adder 105 is $t_{csa}$, then the critical path of the iterative division/square root unit shown in FIG. 1 is as follows.

$$t_{crit} = t_{QSLC} + t_{mux} + t_{csa} \qquad (4)$$

If $t_{crit}$ is less than the predetermined cycle time of the processor, the best performance gain is then achieved by maximizing the number of iterations performed per cycle. Therefore, instead of producing only one quotient digit per cycle as in FIG. 1, it is desirable to produce multiple quotient digits per cycle. In order to produce multiple quotient digits per cycle, it will be necessary to minimize the latency of quotient digit computation.

SUMMARY OF THE INVENTION

In an SRT division and square root mantissa unit, it is desirable to minimize the latency of the resulting mantissa computation. Each SRT iteration produces a single quotient digit, and requires a partial remainder computation and a quotient digit selection. Therefore, one feature of the present invention is minimization of the latency of a single partial remainder computation. Another feature of the present invention is minimization of the hardware necessary to perform three SRT iterations in a single clock cycle without increasing the latency above the lower bound established by maximal overlapping of quotient digit selection. Still another feature of the present invention is minimization of the hardware necessary to perform four SRT iterations in a single iteration without increasing its latency above the lower bound established by maximal overlapping of quotient digit selection.

According to one aspect of the present invention, the critical path of a single iteration producing a single quotient digit is reduced by speculatively computing the resulting partial remainders for all possible values of the quotient digit. The propagation delays of the carry save adders which speculatively compute the resulting partial remainders are masked by the longer delay through the quotient selection logic. This eliminates the conditional addition or subtraction of the divisor and the partial remainder from the critical path, replacing it with a multiplexor delay.

According to another aspect of the present invention, by analyzing the possible partial remainders needed for the third quotient digit selection, there are only seven possible estimated partial remainders needed to speculatively calculate all possible third quotient digits.

According to still another aspect of the present invention, the savings in area becomes increasingly great as the number of speculatively computed quotient digits is increased beyond three. In theory, n stages of quotient digit computation can be overlapped. Assuming speculative datapath partial remainder calculations each iteration, the critical path of quotient selection module computing n bits per cycle goes through one quotient digit selection logic module, (n−1) carry save adders, and n multiplexors.

One embodiment of the present invention extends maximal overlapping to three quotient digits per cycle. This produces an effective radix-8 implementation. Such embodiment of the present invention cascades three partial remainder computation circuits, and extends quotient digit selection overlapping techniques to three stages.

According to a yet another of the present invention, the amount of fourth stage quotient selection hardware is reduced from fifteen quotient digit selection logic modules to seven quotient digit selection logic modules, while not affecting the length of the critical path.

These and other features, aspects, and advantages of the present invention will be apparent from the detailed description of the invention with references to the Figures.

BRIEF DESCRIPTION OF THE DRAWINGS

FIGS. 5 and 6, taken together, illustrate one embodiment of the present invention according to the first and second aspects of the present invention.

The detailed description of the invention discusses the above-described Figures in much greater detail.

DETAILED DESCRIPTION OF THE INVENTION

Figure 2:
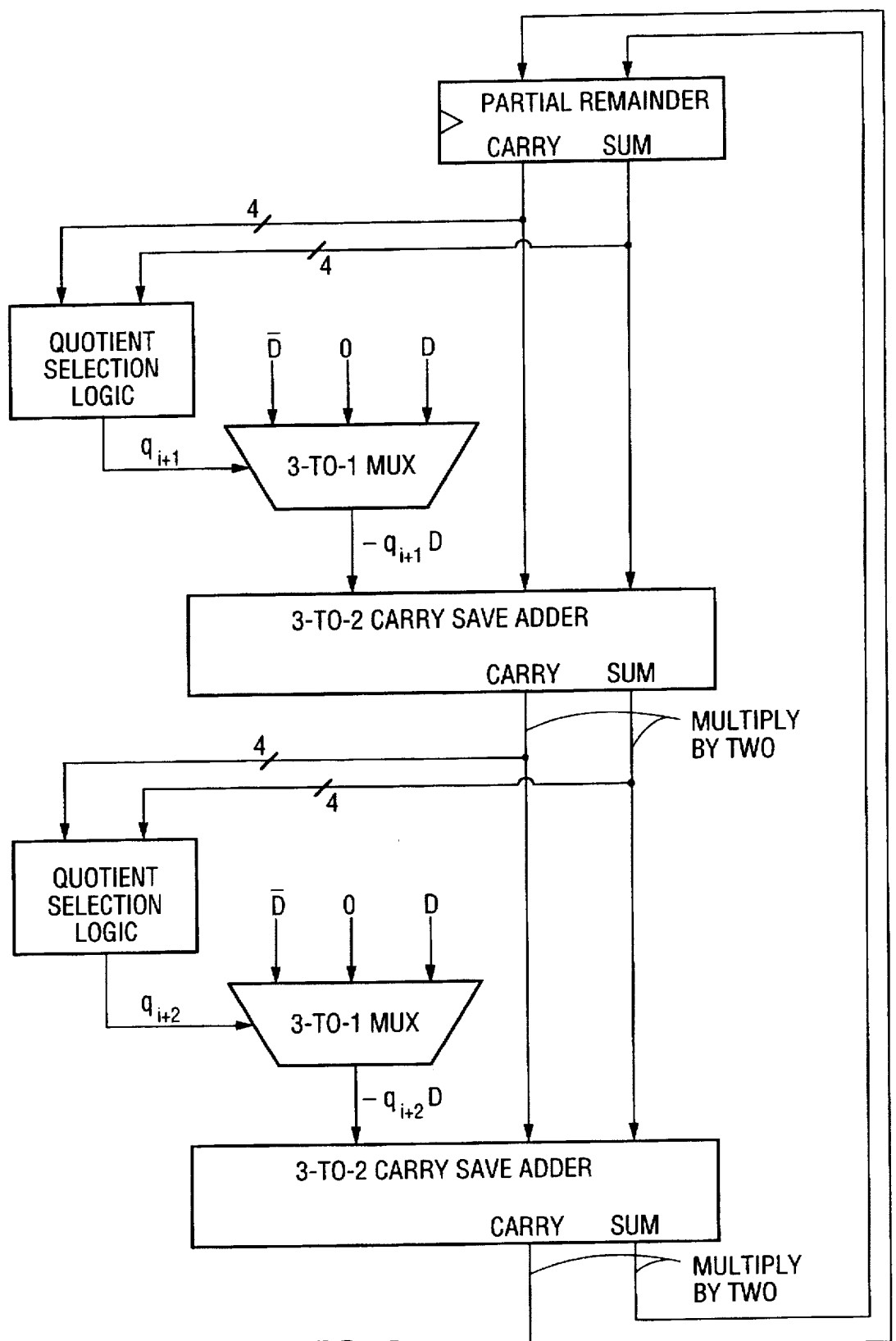
FIG. 2 is a simplified logical illustration of the critical path of a serialized SRT division and square root mantissa unit that produces two quotient digits per clock cycle.

In order to produce more than one quotient digit per cycle, several options should be considered. A straightforward way of generating n quotient digits per cycle is to serialize the basic SRT radix-2 implementation. FIG. 2 illustrates the critical path of a serialized implementation of the hardware divide/square root unit producing two quotient digits per cycle. This serialized solution is not particularly attractive since the critical path includes n quotient selection logic delays, n multiplexor delays, and n carry save adder delays. The latency through the critical path of the two quotient digit per cycle divider/square root unit shown in FIG. 2 is as follows.

$$t_{crit} = 2*t_{QSLC} + 2*t_{mux} + 2*t_{csa} \quad (5)$$

If the serialized approach is used, the iterative divide and square root hardware could become the slowest functional unit, thus limiting the critical path of the processor, since the length of the critical path in the divide and square root hardware is directly proportional to the number of digits per cycle produced. If the iterative divide and square root hardware becomes the slowest functional unit, an alternative to reducing the cycle time is to reduce the number of quotient digits calculated per cycle; however, this solution degrades the floating point performance. Thus, one objective of the present invention is to increase the quotient digit throughput without increasing the cycle time.

Figure 3:
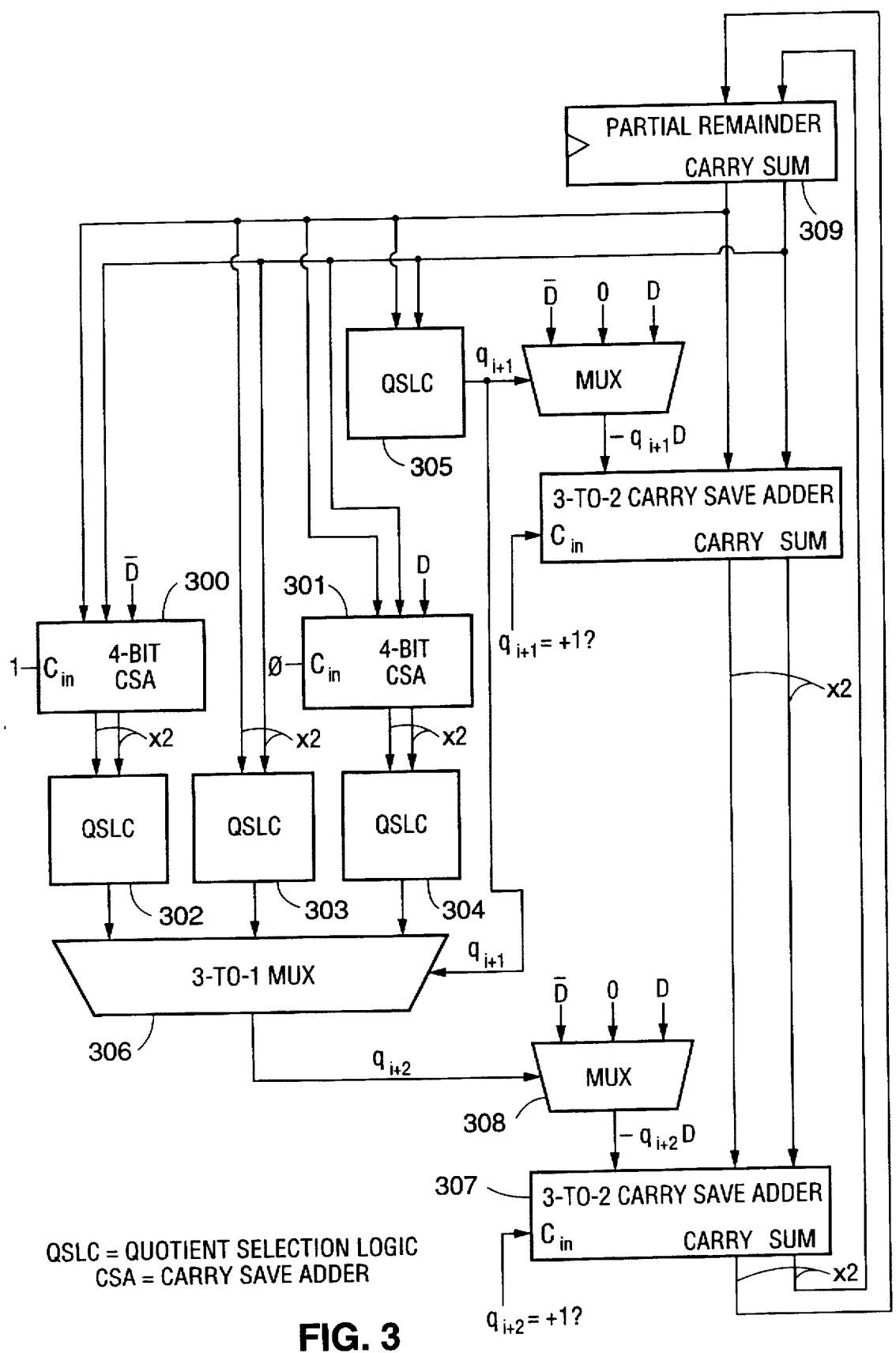
FIG. 3 is a simplified logical illustration of a portion (including the critical path) of a SRT division and square root mantissa unit that overlaps quotient digit selection logic and that produces two quotient digits per clock cycle.

Overlapping quotient selection logic for the first and second iterations as shown in FIG. 3 yields better timing results since only one quotient select logic block is in the critical path. See, G. S. Taylor, "Radix 16 SRT dividers with overlapped quotient selection stages," Proc. Seventh IEEE Symp. Comput. Arithmetic, pp. 95–101, 1985. Although the carry save adder 307 which adds to the previous partial remainder is significantly wider (59 bits in an implementation capable of supporting IEEE standard double precision operands and output) than the carry save adders 300 and 301 which speculatively compute the estimated partial remainders for the second quotient digit, their latencies ($t_{csa}$) are identical since no carry propagation is required in a carry save adder. By the same token, the latencies through multiplexors 306 and 308 are identical. The latency through the critical path of the two bit per cycle divider/square root unit shown in FIG. 3 is as follows.

$$t_{crit} = t_{csa} + t_{QSLC} + t_{mux} + t_{mux} + t_{csa} \quad (6A)$$

$$= t_{QSLC} + 2*t_{csa} + 2*t_{mux} \quad (6B)$$

The critical path is from the partial remainder register 309 through either 4-bit carry save adder 300 or 301, the QSLC 302 or 304, multiplexor 306, multiplexor 308, and carry save adder 307. By comparing Equations 5 and 6B, it can easily be seen that the overlapped two bit per cycle division module shown in FIG. 3 eliminates one quotient selection delay by introducing a more sophisticated quotient selection logic circuit to produce the second quotient digit $q_{i+2}$.

The second quotient digit computation is dependent upon the results of the first quotient digit computation. This is an unavoidable consequence inherent in an iterative process. The quotient digit selection logic (QSLC) is relatively complex compared to the other circuit elements—carry save adders, multiplexors, flip flops—in the critical path. Separate hardware circuits are dedicated to each of the three possible values of the first quotient digit $q_{i+1}$. The path having adder 300 and QSLC 302 computes $q_{i+2}$ assuming that $q_{i+1}=1$; the path having QSLC 303 computes $q_{i+2}$ assuming that $q_{i+1}=0$; and the path having adder 301 and QSLC 304 computes $q_{i+2}$ assuming $q_{i+1}=-1$. The selection of the first quotient digit $q_{i+1}$ enables a path through the multiplexor 306 corresponding to $q_{i+1}$ so that the correct one of three parallel computed possibilities is allowed to be passed to the multiplexor output as $q_{i+2}$. Overlapping is achieved by performing +D and –D operations using small carry save adders 300 and 301 on the most significant five bits of the partial remainder while the first quotient selection digit is being determined. In this way, the second quotient digit selection computation using quotient selection logic modules 302, 303 and 304 starts before the first quotient digit selection computation using quotient selection logic module 305 finishes. Carry save adders 300 and 301 subtract the divisor from and add the divisor to the most significant five bits of the partial remainder, respectively.

Figure 4:
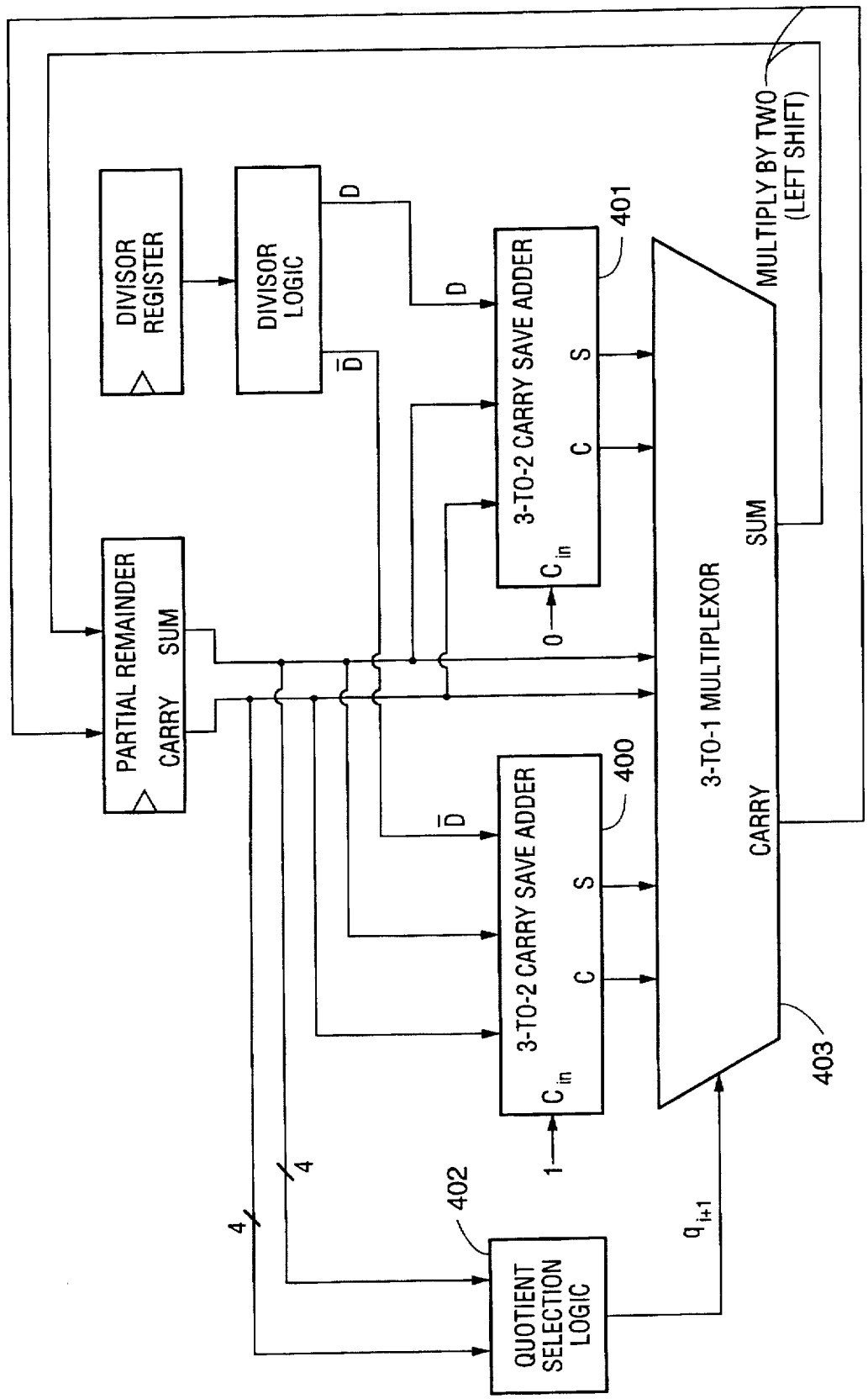
FIG. 4 is a simplified logical illustration of a portion (including the critical path) of a SRT division and square root mantissa unit that speculatively computes all three possible .partial remainders and produces a single quotient digit per clock cycle according to a first aspect of the present invention.

According to a first aspect of the present invention, the critical path of a single iteration producing a single quotient digit $q_{i+1}$ is reduced by speculatively computing the resulting partial remainders for all possible values of $q_{i+1}$. FIG. 4 illustrates a circuit according to this aspect of the present invention. The propagation delay through the circuit in FIG. 4 is as follows.

$$t_{crit} = t_{QSLC} + t_{mux} \quad (7)$$

Figure 1:
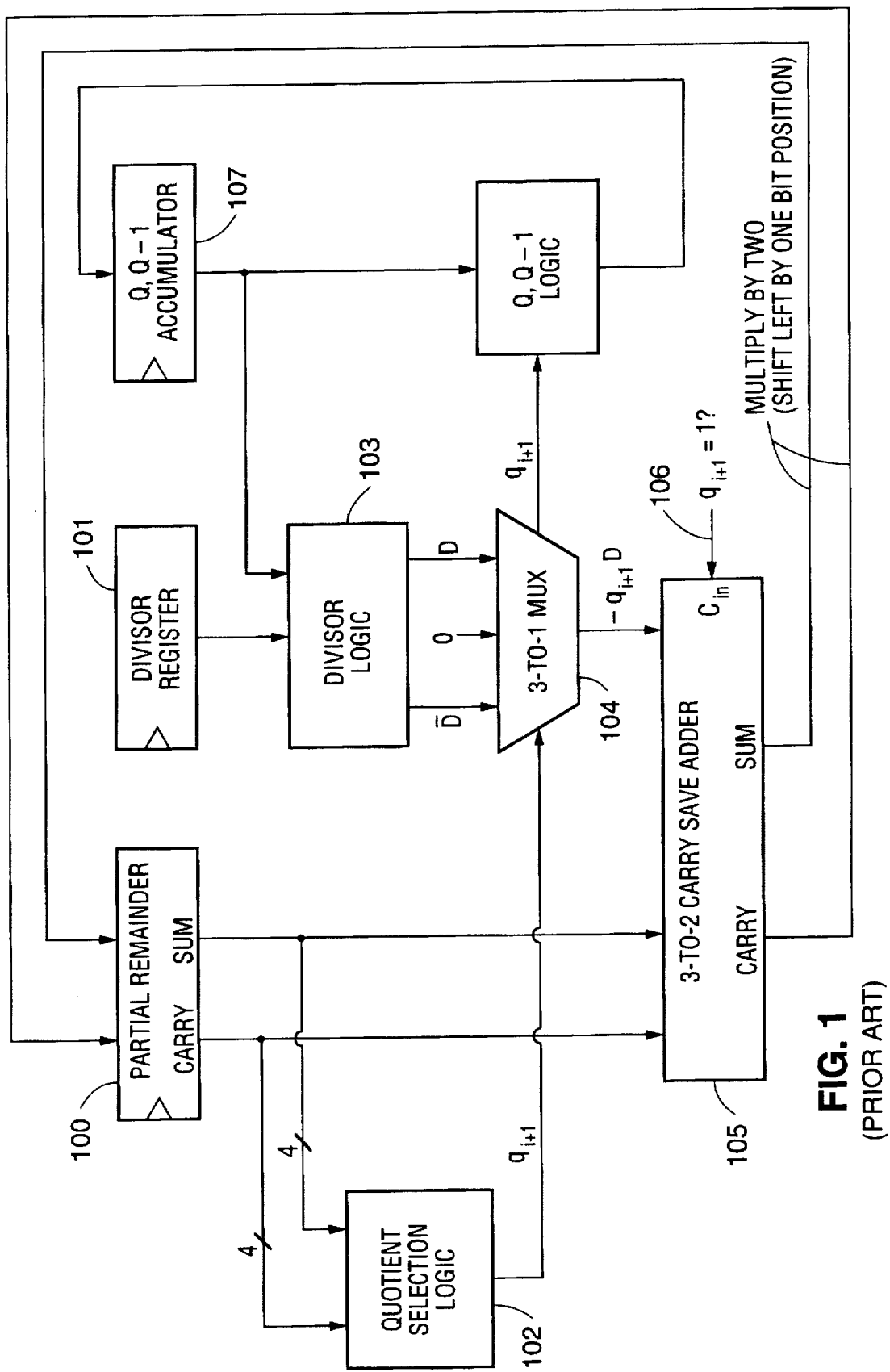
FIG. 1 is a simplified logical illustration of a typical SRT division and square root mantissa unit that produces one quotient digit per clock cycle according to the prior art.

By comparing Equations 4 and 7, it is easily determined that the circuit shown in FIG. 4 according to the present invention eliminates a carry save adder delay as compared to the circuit shown in FIG. 1. The propagation delays of the carry save adders 400 and 401 are masked by the longer delay through the quotient selection logic 402. The area expense is not insignificant as the carry save adders 400 and 401 and multiplexor 403 are each as wide as the precision of the partial remainder, which for the three digit per cycle implementation is 59 bits so that standard double precision mantissa results including guard and round bits can be generated.

Figure 5:
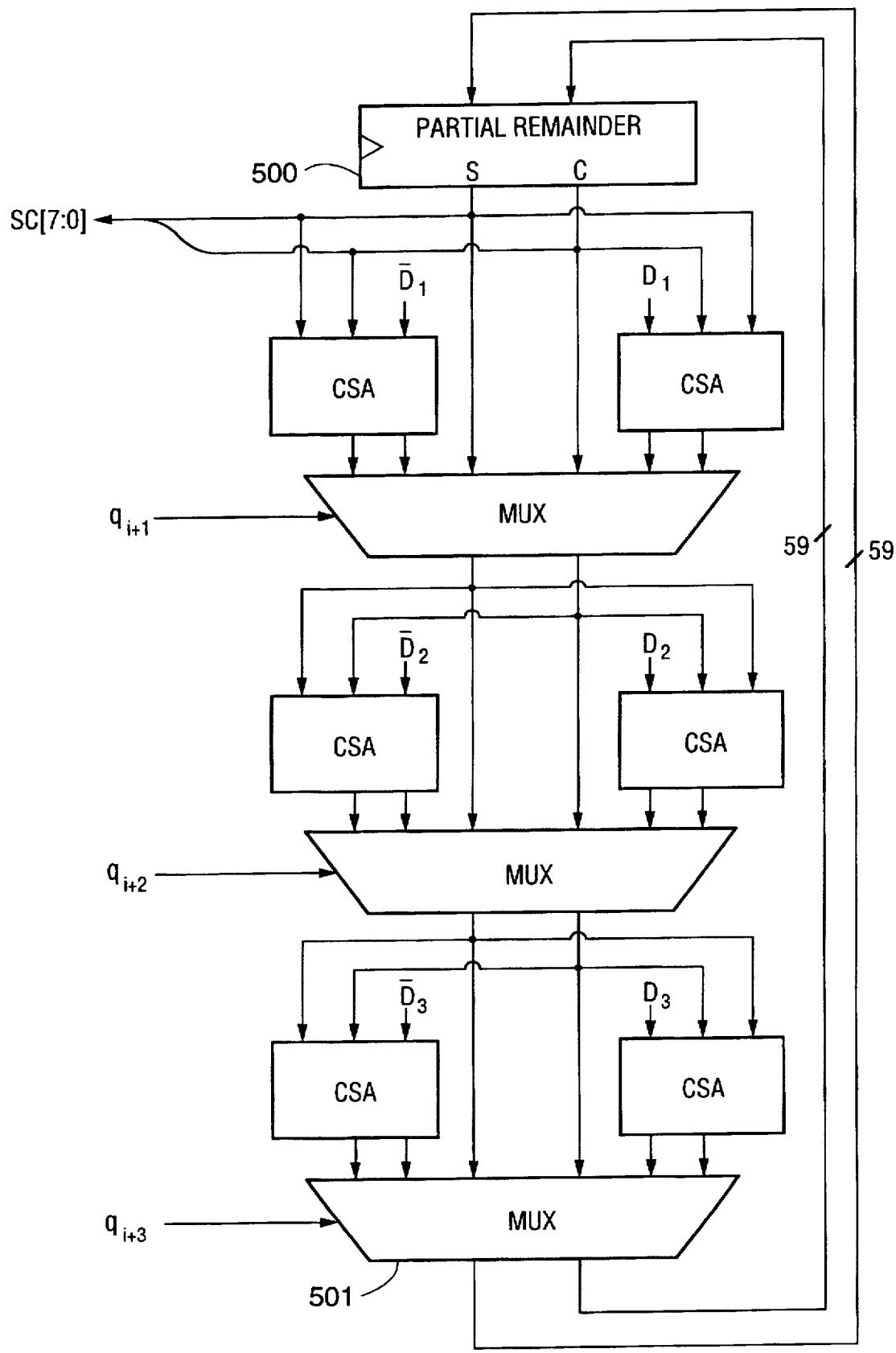
FIG. 5 is a simplified logical illustration of a partial remainder computation circuit of a SRT division and square root mantissa unit that computes the partial remainder corresponding to three quotient digits computed during a single clock cycle according to the first aspect of the present invention.
Figure 6:
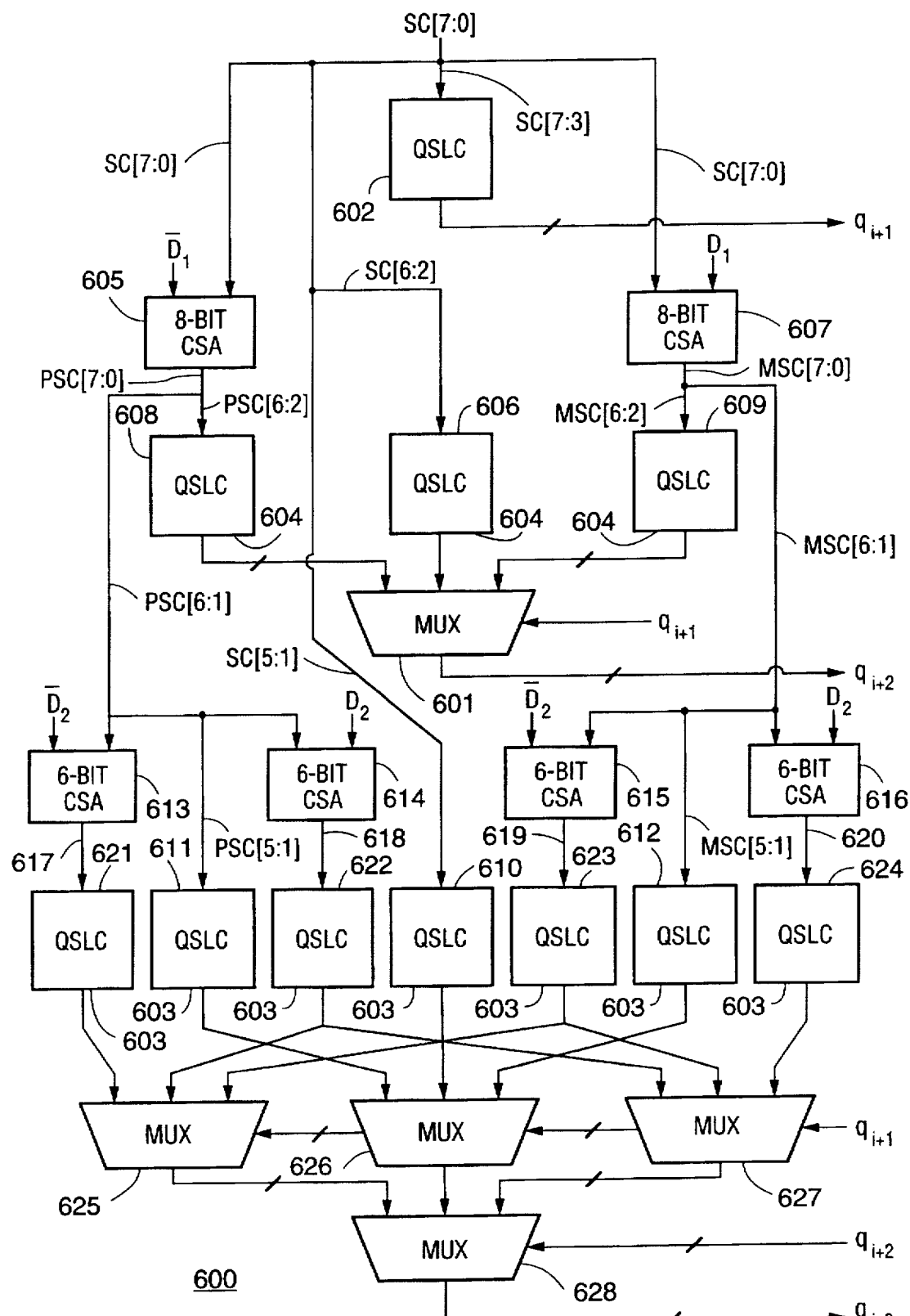
FIG. 6 is a simplified logical illustration of three overlapped quotient digit selection stages compatible with the partial remainder computation circuit depicted in FIG. 5. The third overlapped quotient digit selection stage illustrated in FIG. 6 is constructed according to a second aspect of the present invention.

FIGS. 5 and 6 illustrate a three bit per cycle division/square root unit according to one embodiment of the present invention. The subcircuit illustrated in FIG. 5 cascades three partial remainder computation circuits as shown in FIG. 4. As in FIG. 4, this eliminates the conditional addition or subtraction of the divisor and the partial remainder from the critical path, replacing it with a multiplexor delay.

FIG. 6 illustrates overlapped quotient selection for the three quotient digits $q_{i+1}$, $q_{i+2}$, and $q_{i+3}$. The overlapped quotient computation circuit 600 according to the present invention shown in FIG. 6 extends the overlapping technique of the circuit of FIG. 3 to three stages. The critical path of the circuit of FIGS. 5 and 6 is as follows.

$$t_{crit} = t_{csa} + t_{csa} + t_{QSLC} + t_{mux} + t_{mux} + t_{mux} \quad (8A)$$

$$= t_{QSLC} + 2*t_{csa} + 3*t_{mux} \quad (8B)$$

A critical path begins in partial remainder register 500 in FIG. 5 through either eight bit carry save adder 605 and 607 in FIG. 6, through either six bit carry save adder 613, 614, 615, or 616, through one of QSLC 621, 622, 623, or 624, through one of the three multiplexors 625, 626, or 627, through multiplexor 628, and through multiplexor 501 in FIG. 5. Although three quotient digits are produced, there is only one quotient selection logic delay in the critical path. The QSLCs which contribute to this critical path are the QSLCs 603 which speculatively compute the third quotient digits $q_{i+3}$. The latency of the QSLCs 604 which speculatively compute the second quotient digits $q_{i+2}$ and the QSLC 602 which computes the first quotient digit $q_{i+1}$ are masked by the greater latency through the critical path. The partial remainder input SC[7:0] to the overlapped quotient computation circuit 600 are the most significant eight bits of the redundant carry and sum portions of the partial remainder. Although each QSLC requires only five carry and sum bits of partial remainder input, the most significant eight bits of the redundant partial remainder are required as input to the overlapped quotient selection circuit 600 so as to correctly provide the second and third overlapped stages with the correct partial remainder bits necessary to compute their respective estimated partial remainders. The first stage QSLC 602 takes the most significant five bits SC[7:3] of the redundant partial remainder as inputs.

The second stage of quotient selection circuits speculatively compute the $q_{i+2}$ value corresponding to each of the three possible values of $q_{i+1}$; therefore, it is necessary to compute the three possible estimated partial remainders which correspond to the three values of $q_{i+1}$. To handle the case in which $q_{i+1}=0$, no addition or subtraction of the divisor is required, thus only a multiplication by two is performed by left shifting the estimated partial remainder so that SC[6:2] are input into QSLC 606. To handle the case where $q_{i+1}=+1$, the 8-bit carry save adder 605 adds the two's complement of the divisor D (negative D) to the most significant eight bits of the partial remainder SC[7:0] to produce PSC[7:0], where the "P" indicates that it is an estimated partial remainder which corresponds to a plus one previous quotient digit $q_{i+1}$. Multiplication by two (i.e., doubling) is performed by wiring PSC[6:2] to the inputs of QSLC 608. Any carry outputs of the carry save adders 605 and 607 are discarded. To handle the case where $q_{i+1}=-1$, the 8-bit carry save adder 607 adds the divisor D to the most significant eight bits of the partial remainder SC[7:0] to produce MSC[7:0], where the "M" indicates that it is an estimated partial remainder which corresponds to a minus one previous quotient digit $q_{i+1}$. Multiplication by two (i.e., doubling) is performed by wiring MSC[6:2] to the inputs of QSLC 609.

The third stage of speculatively computed quotient digits requires all possible unique estimated partial remainders which could exist given the first two quotient digits $q_{i+1}$ and $q_{i+2}$. The fact that only seven possible unique estimated partial remainders can exist for any values of $q_{i+1}$ and $q_{i+2}$ is a key to a second aspect of the present invention. To handle the case in which $q_{i+1}=q_{i+2}=0$, no addition or subtraction is required, and the multiplied version SC[5:1] of the original partial remainder is input into QSLC 610. The eight-bit carry save adders 605 and 607 produce seven bits of precision in PSC[6:1] and MSC[6:1], respectively, because the least significant bit of output is not precise since its carry portion is always zero. Similarly, the six-bit carry save adders 613, 614, 615, and 616 produce five-bit outputs 617, 618, 619, and 620, respectively. The amount of precision carried in the first stages of estimated partial remainder computations is dependent upon the desired precision in the last stages. Since the quotient selection logic used in the present invention requires five bits of precision and three stages are overlapped, the first stage of carry save adders 605 and 607 requires eight input bits. In general, for n stages of overlapping where each quotient selection logic module requires m bits, the first stage of adders (corresponding to the second quotient digits) must be m+1+2(n−2) bits wide. The estimated partial remainders in each subsequent stage lose two bits of precision since one bit of precision is lost due to the least significant carry bit being zero as described above, while another bit of precision is lost when the partial remainder is multiplied by two by left-shifting.

Figure 7:
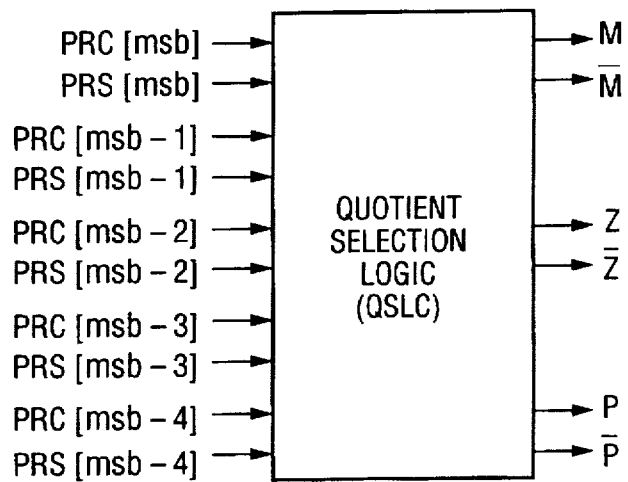
FIG. 7 illustrates the input and output signals for a quotient digit selection logic module compatible with the present invention.

FIG. 7 shows the inputs and outputs to a quotient selection logic module suitable for use in the present invention. As illustrated in FIG. 7, each quotient digit is represented by three separate signals, M, Z, and P, which each corresponds to one of the three possible quotient digit values, −1, 0, and +1, respectively. The quotient selection logic takes the carry and sum portions of the most significant five partial remainder bits as inputs, PRC[msb:msb−4] and PRS[msb:msb−4], respectively. A typical quotient selection logic module takes only the most significant four partial remainder bits as inputs. The fact that the quotient selection logic module according to the present invention takes five redundant partial remainder bits rather than four as is typically done is not of major significance with regard to the present invention, but is shown so as to clearly indicate one embodiment hereof. Using five rather than four redundant partial remainder bit in the quotient selection logic allows better quotient digit selection and allows the correct result to be computed using one less cycle than would otherwise be required if only four bits were considered in selecting the quotient digit. This aspect of the division/square root unit is the subject of co-pending, commonly assigned U.S. patent application Ser. No. 08/498,397 (the disclosure of which is incorporated herein by reference). The quotient selection logic shown in FIG. 6 is fully operative if only four bits are input into each QSLC (quotient selection logic module) rather than five bits as is shown. In that case, the quotient selection unit 600 would require only the seven most significant partial remainder bits; the eight bit carry save adders 605 and 607 would only need to be seven bits wide; and the six bit carry save adders 613, 614, 615, and 616 would only have to be five bits wide.

As shown in FIG. 7, the logical inverses of the quotient signals /M, /Z, and /P are also computed by the QSLC according to the presently preferred embodiment of the present invention. Therefore, each quotient digit is represented by six separate and related signals. For example, $q_{i+1}$, which is the input to multiplexor 601 in FIG. 6 actually consists of $Mq_{i+1}$, $/Mq_{i+1}$, $Zq_{i+1}$, $/Zq_{i+1}$, $Pq_{i+1}$, and $/Pq_{i+1}$, as shown on the control inputs in the detailed illustration of the CMOS subcircuit shown in FIG. 8. The computation of the logical inverse signals /M, /Z, and /P in addition to the positive polarity signals M, Z, and P is useful because the complementary signals can directly enable CMOS transmission gates used to implement the multiplexors depicted in all the Figures. A CMOS transmission gate has an N-channel device enabled by the positive polarity signal for transmitting zeros, and a P-channel device enabled by the negative polarity signal for transmitting ones.

Figure 8:
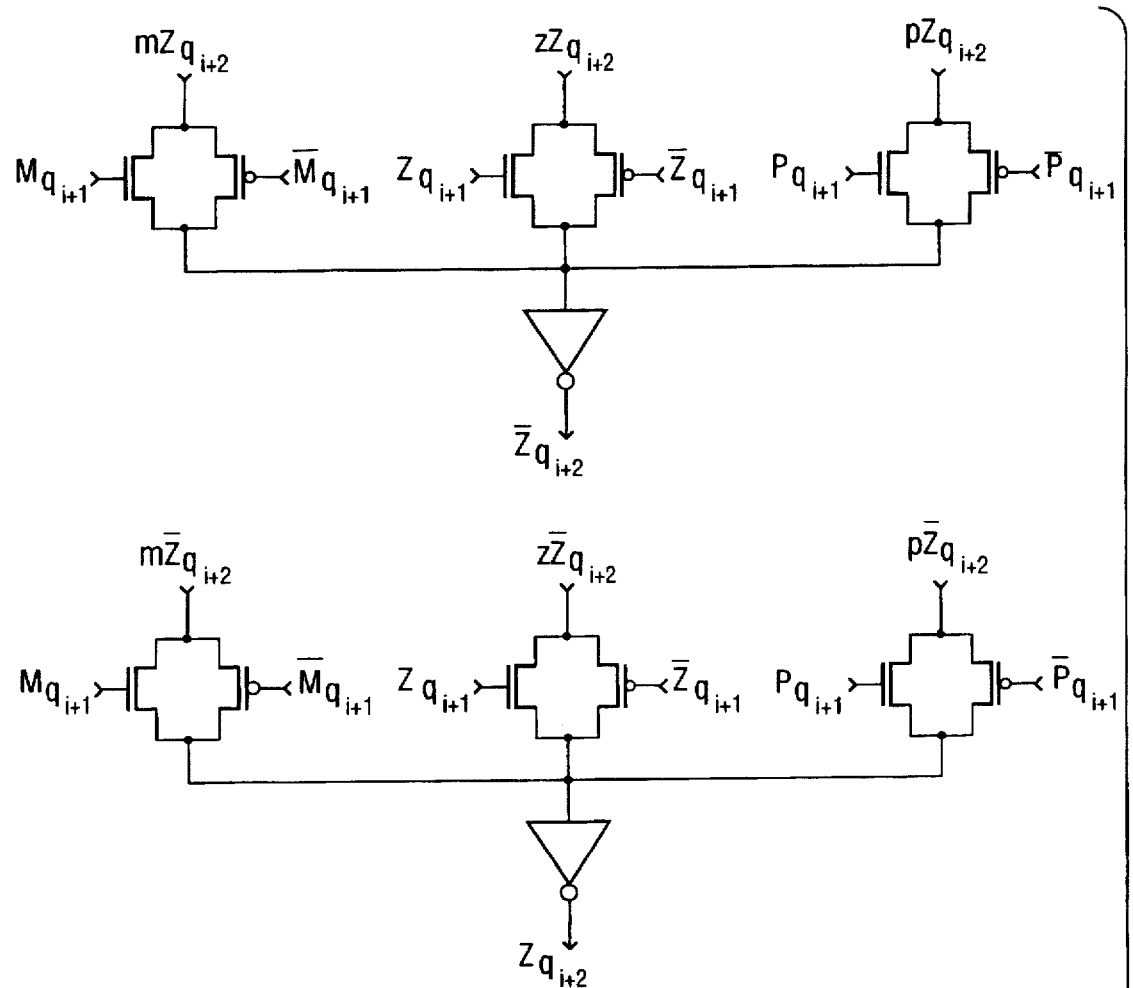
FIG. 8 is a CMOS circuit diagram for a portion of a quotient digit multiplexor such as illustrated in FIG. 6 and compatible with the quotient digit selection logic input/output configuration shown in FIG. 7.

FIG. 8 shows part of an inverting CMOS multiplexor which could be used to implement multiplexor 601 from FIG. 6. By directly computing both polarities of Z, decoded complementary multiplexor control inputs eliminate an inverter delay which would otherwise be required to enable the P-channel devices of the multiplexor transmission gates. FIG. 8 illustrates one third of multiplexor 601 corresponding to the production of $q_{i+2}$. Specifically, the subcircuit depicted in FIG. 8 produces the Z and /Z components of $q_{i+2}$. Similar subcircuits exist for the productions of M and /M and P and /P, in which "M" or "P" replaces all occurrences of "Z" in the data inputs and outputs of the subcircuit of FIG. 8, while the control inputs remain the same.

More importantly, because an inverting CMOS multiplexor is one inverter delay faster from the data inputs to the output, using both polarities for the quotient signals allows faster inverting multiplexors to be used while still producing non-inverted signals at the multiplexor outputs. This is a consequence of the fact that both polarities are transmitted. Thus, the sections of the multiplexor which take the inverted signals as data inputs produce the non-inverted signals as data outputs, while the sections of the multiplexors which take the non-inverted signals as data inputs produce the inverted signals as data outputs, as illustrated in FIG. 8.

Figure 9:
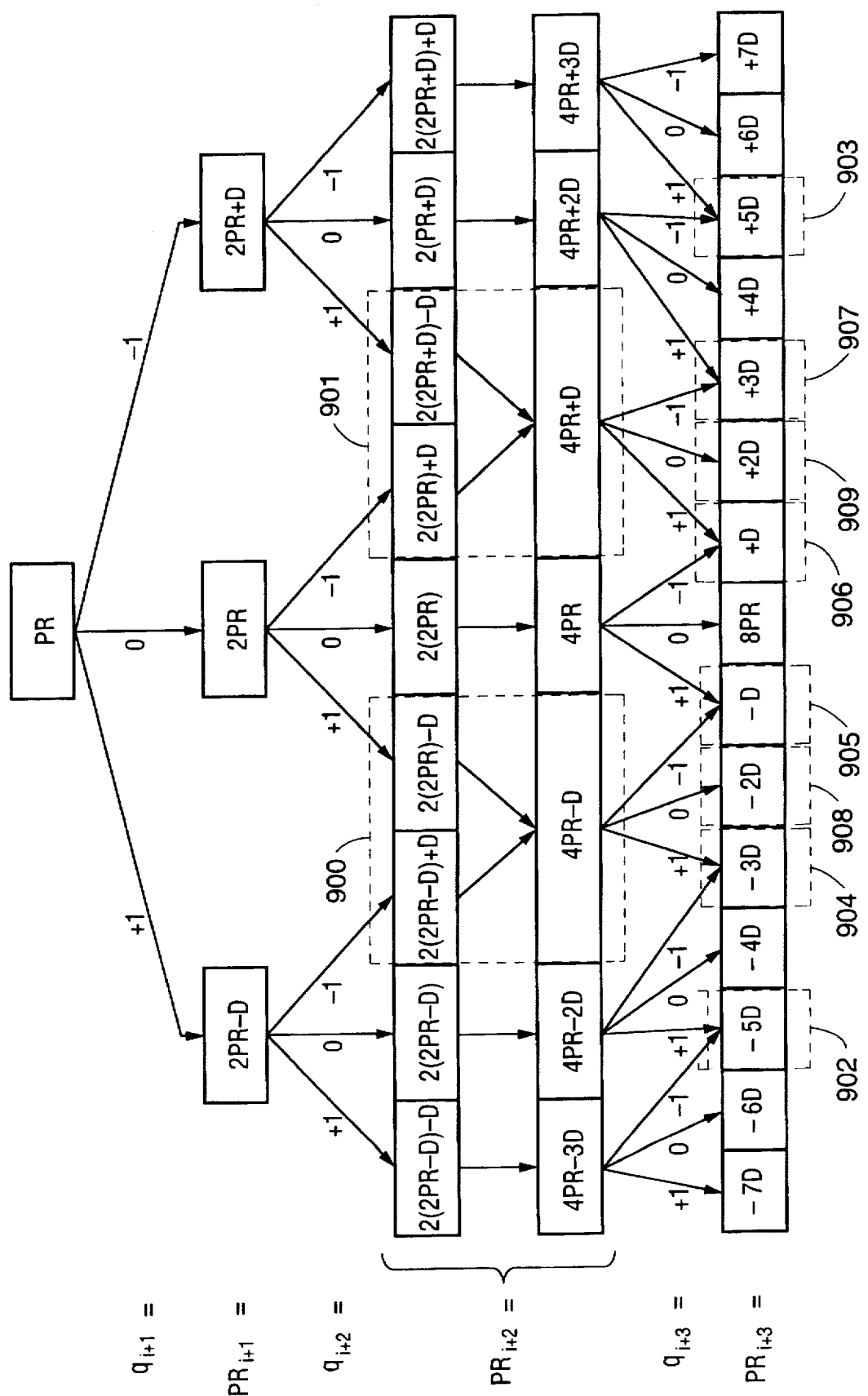
FIG. 9 illustrates the mathematical equivalence of various quotient digit permutations which is the basis for the second aspect of the present invention.

According to a second aspect of the present invention, by analyzing the possible partial remainders needed for the third quotient digit selection, as depicted in FIG. 9, it is easily determined that there are only seven possible estimated partial remainders needed to speculatively calculate all possible third quotient digits. Taylor suggests that nine estimated partial remainders are necessary. See, G. S. Taylor, "Radix 16 SRT dividers with overlapped quotient selection stages," Proc. Seventh IEEE Symp. Comput. Arithmetic, pp. 95–101, 1985. Taylor suggests that because each digit has three possible values in the SRT algorithm, that to speculatively compute n stages requires $3^{n-1}$ estimated partial remainders and $3^{n-1}$ corresponding quotient selection logic modules (QSLC). However, some of the $3^{n-1}$ possibilities are redundant, and thus equivalent to each other. As depicted in FIG. 9, the following quotient digit selections result in the same partial remainder needed for computation of $q_{i+3}$.

TABLE I

| $q_{i+1}$ | $q_{i+2}$ | Resulting Partial Remainder |
|---|---|---|
| +1 | −1 | 4PR − D |
| 0 | +1 | 4PR − D |
| −1 | +1 | 4PR + D |
| 0 | −1 | 4PR + D |

The first two entries in the above table are equivalent essentially because of the following equality.

$$+1*2^1+-1*2^0=0*2^1++1*2^0=1 \qquad (9)$$

In FIG. 9, the dotted box 900 shows the equivalence of the first two entries in the above table. Similarly, the second two entries are equivalent because of the following equality.

$$-1*2^1++1*2^0=0*2^1+-1*2^0=-1 \qquad (10)$$

In FIG. 9, the dotted box 901 shows the equivalence of the second two entries in the above table. According to the first and second aspects of the present invention, the presently preferred embodiment shown in FIG. 5 and 6 extends maximal overlapping to three quotient digits per cycle. This produces an effective radix-8 implementation.

The redundancies in the quotient representations inherent in allowing positive and negative quotient digits permits further reductions in hardware as more quotient digits are speculatively computed. Thus, only one estimated partial remainder need be calculated for each pair of $q_{i+1}$ and $q_{i+2}$ quotient digits shown in the table above. Quotient selection logic is not only timing critical, but also is area intensive. A 2/9 or 22.2% area reduction in the speculative quotient digit calculation hardware for the third quotient digit selection stage is a significant savings. As shown in FIG. 6, QSLCs 622 and 623 each have fanouts of two because they each drive two separate multiplexor inputs. QSLC 622 drives multiplexors 625 and 626, while QSLC 623 drives both multiplexors 626 and 627. The other five third-level QSLCs 621, 611, 610, 612, and 624 each drive only one multiplexor input and thus have fanout of one. The fact that QSLC 622 can drive two multiplexors is a result of the following relation.

$$PSC[6:1]+D=SC[6:1]-D \qquad (11)$$

Thus, the six bit third stage carry save adder 614 which takes PSC[6:1] and D as inputs computes a value identical to the case in which its inputs are SC[6:1] and negative D. Therefore, it is unnecessary to provide an additional six bit carry save adder and QSLC because they both are guaranteed to compute the same result. The same situation holds true for QSLC 623.

$$MSC[6:1]-D=SC[6:1]+D \qquad (12)$$

Because of the above relations 11 and 12, two additional six bit carry save adders and two QSLCs are eliminated from what is suggested by Taylor.

Accordingly, the savings in area becomes increasingly great as the number of speculatively computed quotient digits is increased beyond three. Referring back to FIG. 9, if a fourth quotient digit $q_{i+4}$ is speculatively computed, all the possible unique partial remainders must be calculated for all possible permutations of $q_{i+1}$, $q_{i+2}$, and $q_{i+3}$. Taylor suggests that $3^{n-1}$ partial remainders must be calculated and quotient selection be performed on all of them to speculatively compute all possible nth quotient digits. However, some of these representations are redundant, as shown in the table below.

TABLE II

| $q_{i+1}$ | $q_{i+2}$ | $q_{i+3}$ | Resulting Partial Remainder |
|---|---|---|---|
| +1 | +1 | −1 | 8PR − 5D |
| +1 | 0 | +1 | 8PR − 5D |
| +1 | 0 | −1 | 8PR − 3D |
| +1 | −1 | +1 | 8PR − 3D |
| 0 | +1 | +1 | 8PR − 3D |
| +1 | −1 | 0 | 8PR − 2D |
| 0 | +1 | 0 | 8PR − 2D |
| +1 | −1 | −1 | 8PR − D |
| 0 | +1 | −1 | 8PR − D |
| 0 | 0 | +1 | 8PR − D |
| 0 | 0 | −1 | 8PR + D |
| 0 | −1 | +1 | 8PR + D |
| −1 | +1 | +1 | 8PR + D |
| 0 | −1 | 0 | 8PR + 2D |
| −1 | +1 | 0 | 8PR + 2D |
| 0 | −1 | −1 | 8PR + 3D |
| −1 | +1 | −1 | 8PR + 3D |
| −1 | 0 | +1 | 8PR + 3D |
| −1 | 0 | −1 | 8PR + 5D |
| −1 | −1 | +1 | 8PR + 5D |

In the above table, there are four unique resulting partial remainders which each have three permutations of quotient digits to which it corresponds. There are four unique resulting partial remainder which each have two permutations of quotient digits to which it corresponds. Therefore, twelve QSLCs and carry save adders can be eliminated since each unique partial remainder and its corresponding quotient digit need only be computed by one circuit. In FIG. 9, the partial remainders which are singly redundant are enclosed in dotted boxes 902, 903, 908, and 909 while the partial remainder which are doubly redundant are enclosed in dotted boxes 904, 905, 906, and 907.

In theory, n stages of quotient digit computation can be overlapped. Assuming speculative datapath partial remainder calculations each iteration, the critical path of quotient selection module computing n bits per cycle goes through one QSLC, (n−1) carry save adders, and n multiplexors. Therefore, the length of the critical path is as follows.

$$t_{crit}=t_{QSLC}+(n-1)*t_{csa}+n*t_{mux} \qquad (13)$$

The incremental timing cost is $t_{csa}+t_{mux}$. There are $2^n-1$ partial remainder possibilities for the nth qslc stage. They are within the following range.

$$2^{n-1}PR_i+[-(2^{n-1}-1)D, \ldots, 0, \ldots, (2^{n-1}-1)D]. \quad (14)$$

Therefore, the incremental QSLC cost for the nth overlapped stage is $2^n-1$ rather than $3^{n-1}$ as suggested by Taylor. In practice, maximum overlapping of two to four stages makes the most sense. The table below summarizes timing and quotient selection logic cost considerations for overlapping radix-2 stages. Not surprisingly, there is a timing versus area trade-off. overlapping improves timing at a cost of additional speculative hardware. The focus of the present invention is to optimize timing to the utmost with area minimization as an important, but secondary, goal.

Figure 10:
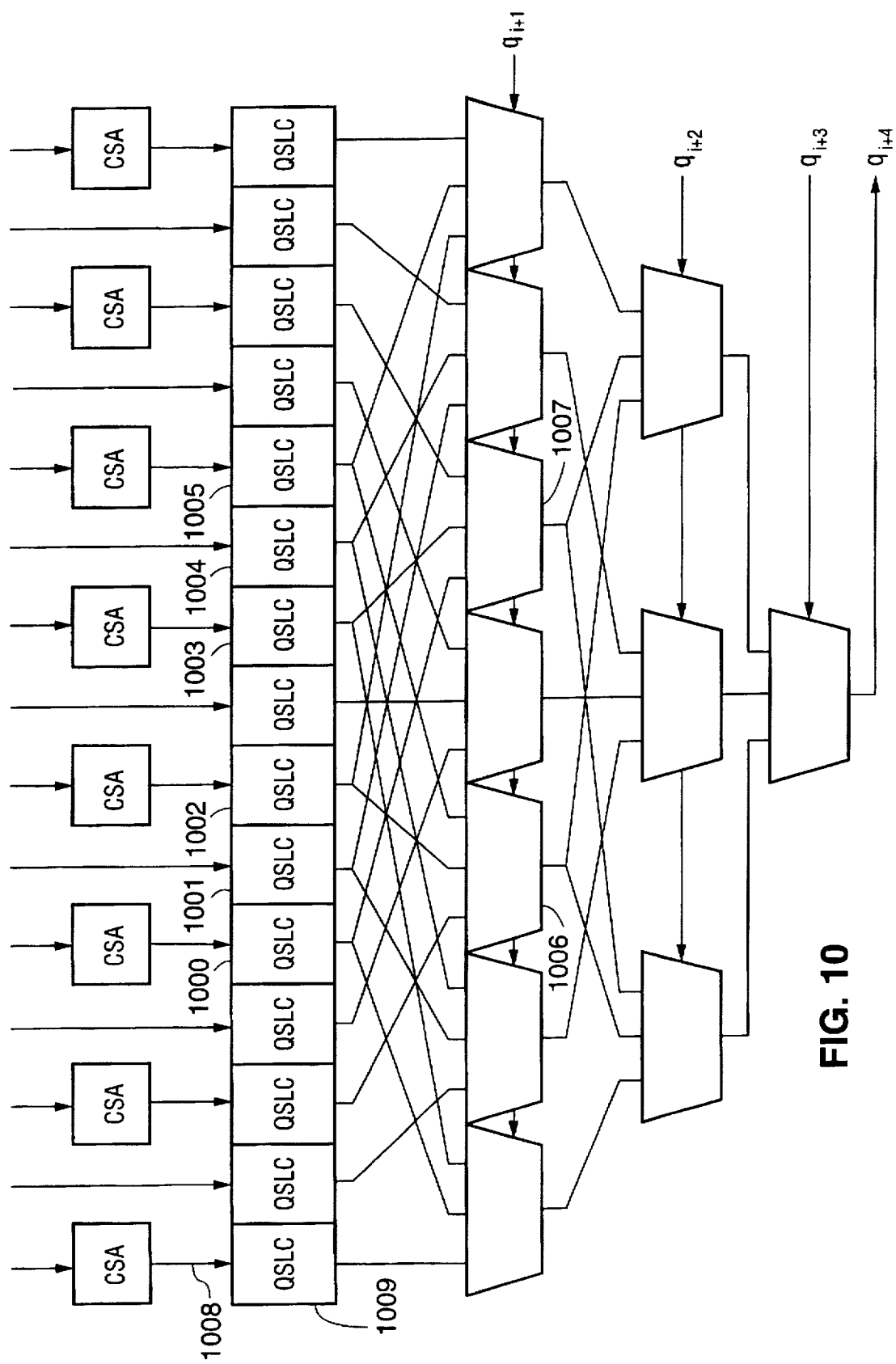
FIG. 10 is a simplified logical illustration of a fourth overlapped quotient digit selection stage of a SRT division and square root mantissa unit according to the second aspect of the present invention.
Figure 11:
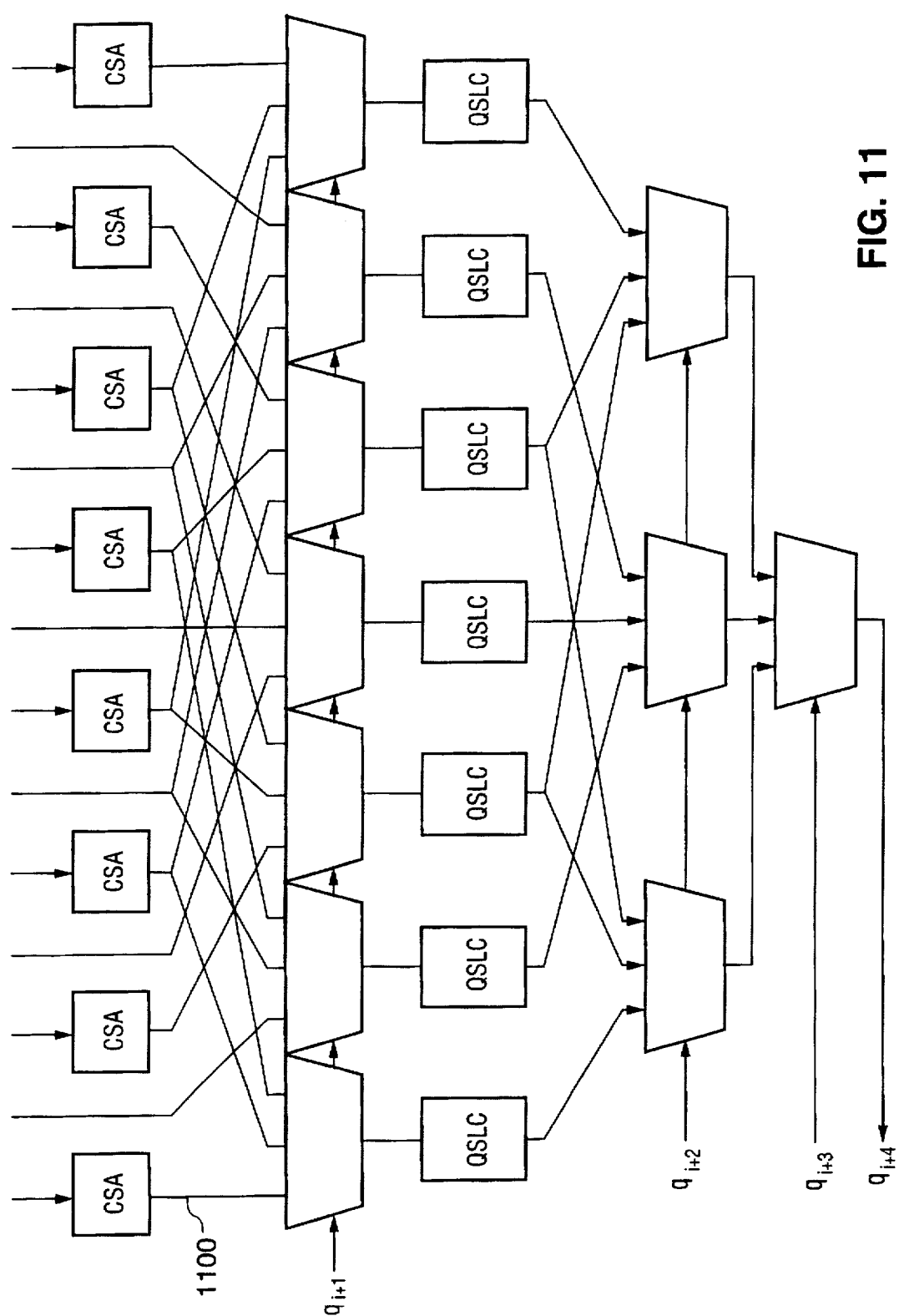
FIG. 11 is a simplified logical illustration of the fourth overlapped quotient digit selection stage of a SRT division and square root mantissa unit according to a third aspect of the present invention which achieves the same latency as the circuit shown in FIG. 10 under certain common circumstances.

The table below shows some of the hardware costs associated with implementing multiple quotient digits per cycle according to the second aspect of the present invention. There are other hardware costs in terms of multiplexors and carry save adders which are not included in the table below because they are not as significant as the cost of the QSLCs.

level of three-to-one multiplexors (for example 1006 in FIG. 10) following the fourth stage of QSLCs can be moved in front of the fourth stage of QSLCs as shown in FIG. 11. The result is that $q_{i+1}$ in FIG. 11 becomes valid at the same time that the fourth stage partial remainder (for example, 1100 in FIG. 11) becomes valid. Thus, the fourth stage number of QSLCs is reduced from fifteen to seven while computing the same result with the same overall latency as was achieved in the circuit of FIG. 10. In terms of area conservation, the optimal degree of overlapping without sacrificing latency will depend on the relative carry save adder delay and QSLC delay. In order to achieve minimal hardware and latency generally, the degree of overlapping need only be sufficient to mask the delays of previous quotient selection logic stages.

The circuit shown in FIG. 6 has several equivalents. For example, the inputs to carry save adder 614 could be SC[6:1] and negative D rather than PSC[6:1] and positive D. Similarly, the inputs to carry save adder 615 could be SC[6:1] and positive D rather than MSC[6:1] and negative D. In the case of four digit overlapped quotient digit computation, either of the two different third stage partial remainders corresponding to the up to three previous quo-

TABLE III

PERFORMANCE, COST TABLE FOR MAXIMUM OVERLAPPING

| Stages | Critical Path | Total QSLCs-Invention vs. Taylor | Delta Critical Path | Delta QSLCs-Invention vs. Taylor |
|---|---|---|---|---|
| 1 | $t_{QSLC} + t_{mux}$ | 1 vs. 1 | — | — |
| 2 | $t_{QSLC} + t_{csa} + t_{mux}$ | 4 vs. 4 | $t_{csa} + t_{mux}$ | 3 vs. 3 |
| 3 | $t_{QSLC} + 2t_{csa} + 3t_{mux}$ | 11 vs. 13 | $t_{csa} + t_{mux}$ | 7 vs. 9 |
| 4 | $t_{QSLC} + 3t_{csa} + 4t_{mux}$ | 26 vs. 40 | $t_{csa} + t_{mux}$ | 15 vs. 27 |
| n | $t_{QSLC} + (n-1)t_{csa} + (n)t_{mux}$ | $\sum_{i=1}^{n} 2^i - 1$ vs. $\sum_{i=1}^{n} 3^{i-1}$ | $t_{csa} + t_{mux}$ | $2^n - 1$ vs. $3^{n-1}$ |

FIGS. 10 and 11 show two ways to speculatively compute four quotient digits per cycle. FIG. 10 is an example of maximal overlapping according to a second aspect of the present invention. In FIG. 10, QSLCs 1000, 1001, 1002, 1003, 1004, and 1005 each have fanouts of two, and each eliminate an additional carry save adder and QSLC which would otherwise be necessary. However, the savings in hardware at the fourth stage due the second aspect of the present invention is more than the six QSLCs and carry save adders described above. The fanout of two at the third stage of the outputs of multiplexors 1006 and 1007 eliminates six additional QSLCs, four additional carry save adders and two multiplexors.

According to a third aspect of the present invention, the amount of fourth stage quotient selection hardware is reduced from fifteen QSLCs to seven QSLCs, while not affecting the length of the critical path. Maximum overlapping, as described above, is not always necessary to achieve the optimal radix-2 implementation critical path as illustrated in a four bit per cycle example shown in FIG. 11. Suppose the quotient selection logic delay $t_{QSLC}$ is three times a carry-save adder delay $t_{csa}$. Then the quotient digit ($q_{i+1}$ in FIG. 10) from the first stage QSLC (602 in FIG. 6) will be valid at the same time as the fourth stage partial reminders (for example, 1008 in FIG. 10) are entering the fourth stage QSLCs (for example, 1009 in FIG. 10), because the fourth stage partial remainders have been computed by three carry save adders in series while the first stage quotient digit has been computed by one QSLC. Therefore, the first tient digit permutations which result in the same unique fourth stage partial remainder can be used to compute each unique fourth stage partial remainder. The optimal way to compute each partial remainder should be based upon minimizing fanout in the critical paths. For example, in FIG. 6, SC[6:1] was not chosen to compute third stage partial remainder 618 because that would unnecessarily load the already high fanout of the SC signal. Thus, because PSC is available with less fanout, it is used to compute the appropriate unique third stage partial remainder.

While the present invention has been disclosed with particular reference to one embodiment, that embodiment is presented by way of example, not by way of limitation. Those of ordinary skill in the art will be enabled by this disclosure to add to or modify the embodiment of the present invention as disclosed herein in various ways as needed and still be within the scope and spirit of the present invention as recited in the appended claims.

For example, as described fully above and shown in Table III, maximal overlapping can be extended to n stages.

Furthermore, it is clear from the discussion above how less-than-maximal overlapping can be designed so as to achieve the same latency as maximal overlapping for larger extensions of the number of quotient digits per cycle depending upon the relative latencies of carry save adders and quotient digit selection logic. Accordingly, such extensions are intended to lie within the spirit and scope of the claimed invention.

What is claimed is:

1. A circuit that computes a partial remainder, the circuit comprising:

a q1 subtraction adder that takes an inverse q1 divisor and a doubled previous q1 partial remainder as inputs and produces a decreased speculative q1 partial remainder as output;

a q1 addition adder that takes a divisor and the doubled previous q1 partial remainder as inputs and produces an increased speculative q1 partial remainder as output; and a q1 multiplexor that takes the decreased speculative q1 partial remainder, the increased speculative q1 partial remainder, and the doubled previous q1 partial remainder as inputs and produces a q1 partial remainder as output that is one of the decreased speculative q1 partial remainder, the increase speculative q1 partial remainder and the doubled previous q1 partial remainder.

2. A circuit that computes a partial remainder as in claim 1, wherein the q1 multiplexor takes a q1 quotient digit as a select input, such that the q1 multiplexor outputs the decreased speculative q1 partial remainder if the q1 quotient digit is positive, the increased speculative q1 partial remainder if the q1 quotient digit is negative, or the doubled previous q1 partial remainder if the q1 quotient digit is zero.

3. A circuit that computes a partial remainder as in claim 2, wherein the q1 quotient digit is represented by an M signal, a Z signal, and a P signal, such that the M signal is asserted if the q1 quotient digit is negative, such that the Z signal is asserted if the q1 quotient digit is zero, and such that the P signal is asserted if the q1 quotient digit is positive.

4. A circuit that computes a partial remainder as in claim 3, wherein the q1 quotient digit is further represented by a /M signal, a /Z signal, and a /P signal, such that the /M signal is asserted if the q1 quotient digit is not negative, such that the /Z signal is asserted if the q1 quotient digit is not zero, and such that the /P signal is asserted if the q1 quotient digit is not positive.

5. A circuit that computes a partial remainder as in claim 1, wherein the decreased speculative q1 partial remainder is in carry save form having a decreased speculative q1 partial remainder carry portion and a decreased speculative q1 partial remainder sum portion, wherein the increased speculative q1 partial remainder is in carry save form having an increased speculative q1 partial remainder carry portion and an increased speculative q1 partial remainder sum portion, and wherein the doubled previous q1 partial remainder is in carry save form having a doubled previous q1 partial remainder carry portion and a doubled previous q1 partial remainder sum portion.

6. A circuit that computes a partial remainder as in claim 1, wherein the inverse q1 divisor is a one's complement of the divisor, wherein the q1 subtraction adder takes an asserted carry input, and wherein the q1 addition adder takes a deasserted carry input.

7. A circuit that computes a partial remainder as in claim 1, further comprising:

a partial remainder register that takes a doubled partial remainder as input and produces the doubled previous q1 partial remainder as output.

8. A circuit that computes a partial remainder as in claim 7, wherein the doubled partial remainder is the q1 partial remainder shifted left by one binary bit position.

9. A circuit that computes a partial remainder as in claim 2, further comprising:

a q2 subtraction adder that takes an inverse q2 divisor and a doubled previous q2 partial remainder as inputs and produces a decreased speculative q2 partial remainder as output;

a q2 addition adder that takes a divisor and the doubled previous q2 partial remainder as inputs and produces an increased speculative q2 partial remainder as output;

a q2 multiplexor that takes the decreased speculative q2 partial remainder, the increased speculative q2 partial remainder, and the doubled previous q2 partial remainder as inputs and produces a q2 partial remainder as output;

a q3 subtraction adder that takes an inverse q3 divisor and a doubled previous q3 partial remainder as inputs and produces a decreased speculative q3 partial remainder as output;

a q3 addition adder that takes a divisor and the doubled previous q3 partial remainder as inputs and produces an increased speculative q3 partial remainder as output; and a q3 multiplexor that takes the decreased speculative q3 partial remainder, the increased speculative q3 partial remainder, and the doubled previous q3 partial remainder as inputs and produces a q3 partial remainder as output;

wherein the doubled previous q2 partial remainder is the q1 partial remainder shifted left by one binary bit position;

wherein the doubled previous q3 partial remainder is the q2 partial remainder shifted left by one binary bit position;

wherein the q2 multiplexor takes a q2 quotient digit as a select input, such that the q2 multiplexor outputs the decreased speculative q2 partial remainder if the q2 quotient digit is positive, the increased speculative q2 partial remainder if the q2 quotient digit is negative, or the doubled previous q2 partial remainder if the q2 quotient digit is zero; and wherein the q3 multiplexor takes a q3 quotient digit as a select input, such that the q3 multiplexor outputs the decreased speculative q3 partial remainder if the q3 quotient digit is positive, the increased speculative q3 partial remainder if the q3 quotient digit is negative, or the doubled previous q3 partial remainder if the q3 quotient digit is zero.

10. A circuit that computes a partial remainder as in claim 9, further comprising:

a partial remainder register that takes a doubled partial remainder as input and produces the doubled previous q1 partial remainder as output.

11. A circuit that computes a partial remainder as in claim 10, wherein the doubled partial remainder is the q3 partial remainder shifted left by one binary bit position.

12. A circuit that computes a partial remainder as in claim 9, wherein the q1 divisor, the q2 divisor, and the q3 divisor are each equal to a division divisor, and wherein the inverse q1 divisor, the inverse q2 divisor, and the inverse q3 divisor are each equal to an inverse division divisor.

13. A circuit that computes a partial remainder as in claim 9, wherein the q1 divisor is a q1 square root divisor, wherein the q2 divisor is a q2 square root divisor, wherein the q3 divisor is a q3 square root divisor, wherein the inverse q1 divisor is an inverse q1 square root divisor, wherein the inverse q2 divisor is an inverse q2 square root divisor, and wherein the inverse q3 divisor is an inverse q3 square root divisor.

14. A circuit that computes a partial remainder as in claim 13, wherein all partial remainders and all divisors are 59 bits wide.

15. A method of providing a circuit that computes a partial remainder, the method comprising the steps of:

providing a q1 subtraction adder that takes an inverse q1 divisor and a doubled previous q1 partial remainder as inputs and produces a decreased speculative q1 partial remainder as output;

providing a q1 addition adder that takes a divisor and the doubled previous q1 partial remainder as inputs and produces an increased speculative q1 partial remainder as output; and providing a q1 multiplexor that takes the decreased speculative q1 partial remainder, the increased speculative q1 partial remainder, and the doubled previous q1 partial remainder as inputs and produces a q1 partial remainder as output that is one of the decreased speculative q1 partial remainder, the increase speculative q1 partial remainder and the doubled previous q1 partial remainder.

* * * * *